(12) United States Patent
Jones et al.

(10) Patent No.: US 12,529,637 B2
(45) Date of Patent: Jan. 20, 2026

(54) MEASUREMENT OF WATER CHEMISTRY BY ALTERING THE RESONANT FREQUENCY OF A VIBRATING ELEMENT WITH HYDROPHILIC HYDROGELS

(71) Applicant: Halliburton Energy Services, Inc., Houston, TX (US)

(72) Inventors: Christopher Michael Jones, Houston, TX (US); Michel LeBlanc, Houston, TX (US); James Martin Price, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 321 days.

(21) Appl. No.: 18/239,904

(22) Filed: Aug. 30, 2023

(65) Prior Publication Data
US 2024/0295481 A1 Sep. 5, 2024

Related U.S. Application Data

(60) Provisional application No. 63/448,229, filed on Feb. 24, 2023, provisional application No. 63/447,267, filed on Feb. 21, 2023.

(51) Int. Cl.
*G01N 11/08* (2006.01)

(52) U.S. Cl.
CPC ................... *G01N 11/08* (2013.01)

(58) Field of Classification Search
CPC .. G01N 11/08; G01N 11/16; G01N 2009/006; G01N 9/002; G01N 21/5907; G01N 2291/014; G01H 1/06; G01H 3/04; G01H 13/00

USPC ...... 73/54.04, 54.24–54.25, 54.41, 570, 579, 73/590, 648, 657, 64.41–64.42
See application file for complete search history.

(56) References Cited

U.S. PATENT DOCUMENTS

| | | | |
|---|---|---|---|
| 2008/0007253 A1* | 1/2008 | Takahata | G01D 5/2066 324/207.22 |
| 2009/0241681 A1* | 10/2009 | Machauf | B81B 3/0021 438/49 |
| 2013/0085674 A1 | 4/2013 | Zhdaneev et al. | |
| 2014/0373952 A1 | 12/2014 | Vergne et al. | |

(Continued)

FOREIGN PATENT DOCUMENTS

WO  WO-2010036940 A2 * 4/2010 ........... G01N 29/036

OTHER PUBLICATIONS

Fan, Polyelectrolyte-based conductive hydrogels: from theory to applications, 2022 (Year: 2022).*

(Continued)

*Primary Examiner* — John E Breene
*Assistant Examiner* — Truong D Phan
(74) *Attorney, Agent, or Firm* — John Wustenberg; C. Tumey Law Group PLLC (57) ABSTRACT

A fluid sampling tool may include a fluid characterization device consisting of a densitometer, a viscometer, or a vibrating element, or a combination thereof and a polymer disposed in or around the fluid characterization device, wherein the polymer volume, density, or viscosity changes with an ionic stimulus. The fluid characterization device may be located within a bypass flow line of the sampling tool. A method of measuring pH and a method of monitoring at least two analytes at the same time using the fluid characterization devices are also discussed.

19 Claims, 5 Drawing Sheets

(56) References Cited

U.S. PATENT DOCUMENTS

2016/0090837 A1    3/2016   Wang et al.
2018/0172649 A1    6/2018   Shi et al.
2019/0383141 A1*  12/2019   Pelletier ................ E21B 49/086
2022/0255356 A1*   8/2022   Tseng ....................... H04B 5/24

OTHER PUBLICATIONS

Richter, Andreas; Paschew, Georgi; Klatt, Stephan; Lienig, Jens; Arndt, Karl-Friedrich; Adler, Hans-Jürgen P. (2008). Review on Hydrogel-based pH Sensors and Microsensors. Sensors, 8(1), 561-581.

Liu, Li; Li, Xinda; Nagao, Masanori; Elias, Anastasia; Narain, Ravin; Chung, Hyun-Joong (2017). A pH-Indicating Colorimetric Tough Hydrogel Patch towards Applications in a Substrate for Smart Wound Dressings. Polymers, 9(11), 558-.

Molecules, MDPI, Tsegay, et al., 3D Printing of pH Indicator Auxetic Hydrogel Skin Wound Dressing, 2023.

Offshore Technology Conference, Tomar, et al., Novel Technology to Achieve the Fastest and Cleanest Formation Sample Data: An Introduction to Focused Sampling Probe Methodology, 2016.

SPE International, Gao, et al. Sensitivity of a high-Resolution Fluid-Density Sensor in Multiphase Flow, SPE133405, 2010.

International Search Report and Written Opinion for International Patent Application No. PCT/US2023/032943 dated Jan. 5, 2024. PDF file. 8 pages.

\* cited by examiner

MEASUREMENT OF WATER CHEMISTRY BY ALTERING THE RESONANT FREQUENCY OF A VIBRATING ELEMENT WITH HYDROPHILIC HYDROGELS

CROSS REFERENCE TO RELATED APPLICATIONS

This application claims the priority of U.S. Provisional Patent Application No. 63/447,267, filed Feb. 21, 2023, and U.S. Provisional Patent Application No. 63/448,229, filed Feb. 24, 2023, which is incorporated by reference in its entirety.

BACKGROUND

Wells may be drilled at various depths to access and produce oil, gas, minerals, and other naturally occurring deposits from subterranean geological formations. The drilling of a well is typically accomplished with a drill bit that is rotated within the well to advance the well by removing topsoil, sand, clay, limestone, calcites, dolomites, or other materials.

During or after drilling operations, sampling operations may be performed to collect a representative sample of formation or reservoir fluids (e.g., hydrocarbons) to further evaluate drilling operations and production potential, or to detect the presence of certain gases or other materials in the formation that may affect well performance.

During sampling operations, personnel need to understand the formation water chemistry in order to design, plan, and build an economical production and completion strategy. Current wireline formation and sampling tools do not have a viable way to accurately measure water chemistry (ion concentration) downhole under high-temperature and high-pressure conditions.

BRIEF DESCRIPTION OF THE DRAWINGS

The features and advantages of certain examples will be more readily appreciated when considered in conjunction with the accompanying figures. The figures are not to be construed as limiting any of the preferred examples.

DETAILED DESCRIPTION

The present disclosure relates to methods and systems for utilizing hydrogel within a densitometer or around a vibrating element to measure analytes in water downhole. As the hydrogel changes volume in response to a stimulus, the hydrogel density and/or its viscosity change accordingly. Likewise, a vibrating element containing or surrounded by the hydrogel changes its resonant frequency. The swelling and shrinking action as pH changes, for example, also produces a change of density of the hydrogel. When the hydrogel is occupying a fixed volume, the "swelling" action of the hydrogel produces an increase of pressure/compressive stress of the hydrogel, whereas the "shrinking" action corresponds to a decrease in internal pressure/compressive stress and, in this case, the density change has a stronger magnitude. With the change of density is also associated a change in viscosity of the hydrogel. Due to the effects of the change in density and/or viscosity of the hydrogel, the vibrating characteristics of the vibrating element change as pH changes, for example.

In some embodiments, the vibrating element is primarily sensitive to changes in density of the hydrogel. In other embodiments, the vibrating element is primarily sensitive to changes in viscosity of the hydrogel. In some embodiments, the stimulus is a change of pH and the hydrogel swells or shrinks as the surrounding pH changes from the hydrogel $pK_a$. In other embodiments, the stimulus may be an analyte such as an ion. Examples of ion include $K^+$, $Cl^-$, $Ca^{2+}$, $Na^+$, $Mg^{2+}$, $Cu^{2+}$, $Fe^{2+}$, $Mn^{2+}$, $Ni^{2+}$, $Pb^{2+}$, $Co^{2+}$, $Sn^{2+}$, $Cd^{2+}$, $Zn^{2+}$, $Al^{3+}$, $Mo^{5+}$, $CO_3^{2-}$, $Li^+$, $Sr^{2+}$, $F^-$, and $Ag^+$. For example, as the quantity of $Fe^{2+}$ increases within the hydrogel, the volume and/or internal stress of the hydrogel change and the hydrogel's measured physical characteristics, such as its density or its viscosity, change accordingly. Therefore, the sensor comprising a hydrogel and a densitometer, or a hydrogel and a viscometer, or a vibrating element, or a combination thereof, may monitor water chemistry.

In some embodiments, the hydrogel responds to the presence of ions in water by changing volume. Water may be formation produced water, seawater, fresh water pumped downhole or stored in a sampling bottle, or water from a downhole treatment such as a stimulation treatment, a corrosion inhibitor treatment, enhanced oil recovery treatment, primary oil recovery treatment, for example. For instance, downhole water salinity may be monitored by following the changes of vibrating resonance or density of the vibrating element containing or surrounded by the hydrogel due to change of volume, density, or viscosity of the hydrogel when the target analyte ($K^+$, $Cl^-$, $Ca^{2+}$, $Na^+$, $Mg^{2+}$, $Cu^{2+}$, $Fe^{2+}$, $Mn^{2+}$, $Ni^{2+}$, $Pb^{2+}$, $Co^{2+}$, $Sn^{2+}$, $Cd^{2+}$, $Zn^{2+}$, $Al^{3+}$, $Mo^{5+}$, $CO_3^{2-}$, $Li^+$, $Sr^{2+}$, $F^-$, or $Ag^+$) is absorbed by the hydrogel. Additionally, the swelling or shrinking is reversible (with no hysteresis) when the external stimulus (pH or target analyte) is removed. This may allow personnel to calibrate a densitometer downhole at any location based at least in part on the conditions the densitometer may experience. The physical characteristic, such as the density or the resonant frequency of the vibrating element containing or surrounded by the hydrogel, may be calibrated to quantify the amount of volume changes of the hydrogel to the quantity of analyte or pH changes. The influence of downhole pressures and temperatures on the downhole measurements of a specific analyte can be deconvoluted by calibrating the specific hydrogel at specific temperatures and pressures.

Figure 1:
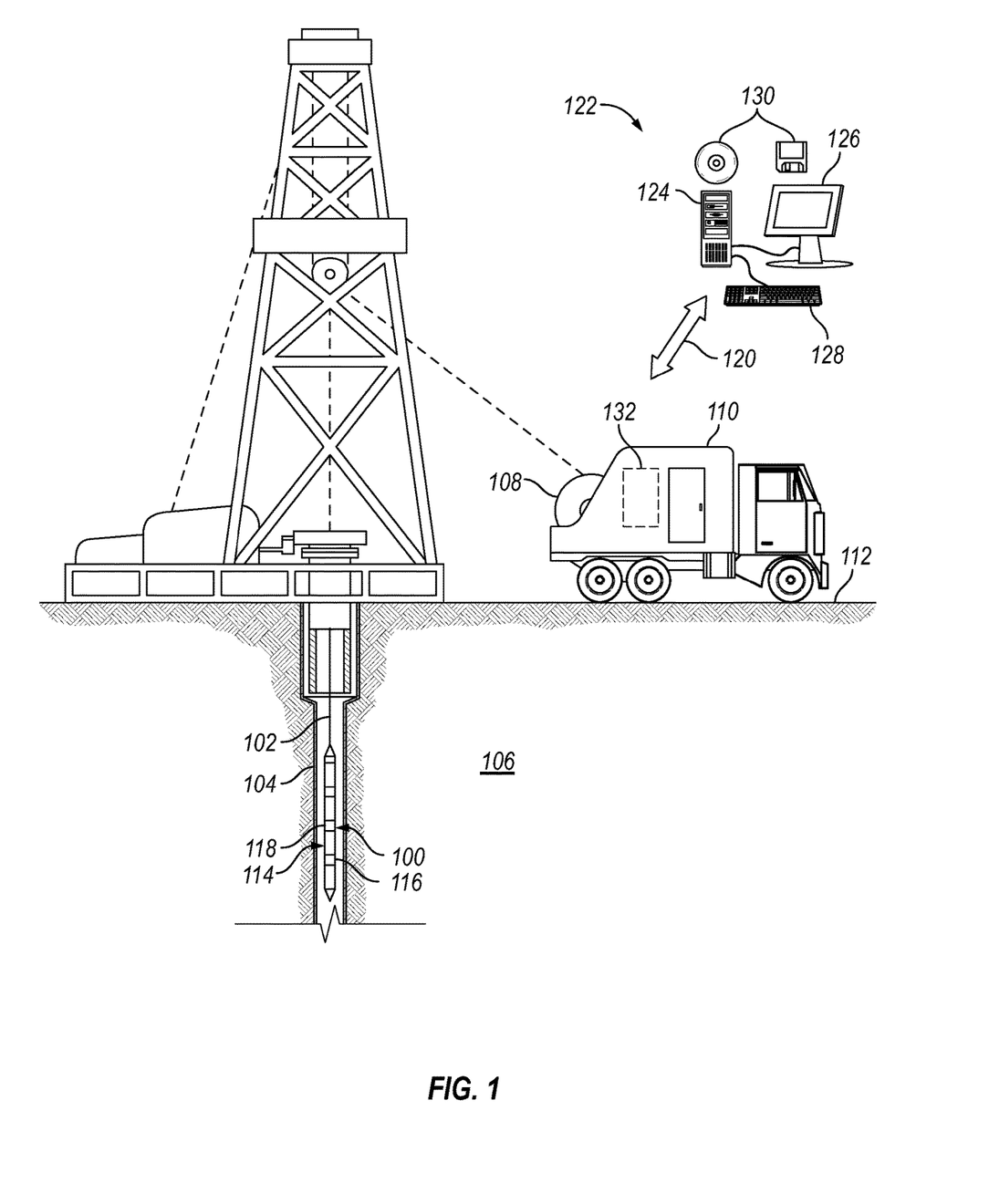
FIG. 1 illustrates a schematic view of a well in which an example embodiment of a fluid sample system is deployed.

FIG. 1 is a schematic diagram of fluid sampling tool 100 on a conveyance 102. As illustrated, wellbore 104 may extend through subterranean formation 106. In examples, reservoir fluid may be contaminated with well fluid (e.g., drilling fluid) from wellbore 104. As described herein, the fluid sample may be analyzed to determine fluid contamination and other fluid properties of the reservoir fluid. As illustrated, a wellbore 104 may extend through subterranean formation 106. While the wellbore 104 is shown extending generally vertically into the subterranean formation 106, the principles described herein are also applicable to wellbores that extend at an angle through the subterranean formation 106, such as horizontal and slanted wellbores. For example, although FIG. 1 shows a vertical or low inclination angle well, high inclination angle or horizontal placement of the well and equipment is also possible.

As illustrated, a hoist 108 may be used to run fluid sampling tool 100 into wellbore 104. Hoist 108 may be disposed on a vehicle 110. Hoist 108 may be used, for example, to raise and lower conveyance 102 in wellbore 104. While hoist 108 is shown on vehicle 110, it should be understood that conveyance 102 may alternatively be disposed from a hoist 108 that is installed at surface 112 instead of being located on vehicle 110. Fluid sampling tool 100 may be suspended in wellbore 104 on conveyance 102. Other conveyance types may be used for conveying fluid sampling tool 100 into wellbore 104, including coiled tubing and wired drill pipe, for example. Fluid sampling tool 100 may comprise a tool body 114, which may be elongated as shown on FIG. 1. Tool body 114 may be any suitable material, including without limitation titanium alloy, stainless steel, other metal alloys, fiber-reinforced composites, plastics, combinations thereof, and the like. Fluid sampling tool 100 may further include one or more sensors 116 for measuring properties of the fluid sample, reservoir fluid, wellbore 104, subterranean formation 106, or the like. In examples, fluid sampling tool 100 may also include a fluid analysis module 118, which may be operable to process information regarding a fluid sample, as described below. The fluid sampling tool 100 may be used to collect fluid samples from subterranean formation 106 and may obtain and separately store different fluid samples from subterranean formation 106.

In examples, fluid analysis module 118 may comprise at least one sensor that may continuously monitor a fluid such as a reservoir fluid, formation fluid, wellbore fluid, or nonnative formation fluid (e.g., drilling fluid filtrate). Such monitoring may take place in a fluid flow line or a formation tester probe, such as in a pad or packer. Alternatively, continuous monitoring of fluid may include making measurements to investigating the formation, for example, by measuring a local formation property with a sensor. Sensors may include, without limitation, optical sensors, acoustic sensors, electromagnetic sensors, conductivity sensors, resistivity sensors, selective electrodes, impedance sensors, density sensors, mass sensors, analyte sensors, thermal sensors, chromatography sensors, viscosity sensors, fluid rheology sensors, bubble point sensors, fluid compressibility sensors, flow rate sensors, pressure sensors, nuclear magnetic resonance (NMR) sensors. Sensors may measure a contrast between drilling fluid filtrate properties and formation fluid properties. Fluid analysis module 118 may be operable to derive properties and characterize the fluid sample. By way of example, fluid analysis module 118 may measure absorption, transmittance, or reflectance spectra, and translate these measurements into, for example, component concentrations of the fluid sample, which may be lumped component concentrations, as described above. The fluid analysis module 118 may also measure gas-to-oil ratio, fluid composition, water cut, live fluid density, live fluid viscosity, formation pressure, formation temperature and/or fluid composition. Fluid analysis module 118 may also be operable to determine fluid contamination of the fluid sample and may include any instrumentality or aggregate of instrumentalities operable to compute, classify, process, transmit, receive, retrieve, originate, switch, store, display, manifest, detect, record, reproduce, handle, invert, or utilize any form of information, intelligence, or data for business, scientific, control, or other purposes. The absorption, transmittance, or reflectance spectra absorption, transmittance, or reflectance spectra may be measured with sensors 116 by way of standard operations. For example, fluid analysis module 118 may include random access memory (RAM), one or more processing units, such as a central processing unit (CPU), or hardware or software control logic, ROM, and/or other types of nonvolatile memory. Fluid analysis module 118 and fluid sampling tool 100 may be communicatively coupled via communication link 120 with information handling system 122.

Any suitable technique may be used for transmitting signals from the fluid sampling tool 100 to the surface 112. As illustrated, a communication link 120 (which may be wired or wireless, for example, electrical or fiber-optic-based) may be provided that may transmit data from fluid sampling tool 100 to an information handling system 122 at surface 112. Information handling system 122 may include a processing unit 124, a monitor 126, an input device 128 (e.g., keyboard, mouse, etc.), and/or computer media 130 (e.g., optical disks, magnetic disks) that can store code representative of the methods described herein. Information handling system 122 may act as a data acquisition system and possibly a data processing system that analyzes information from fluid sampling tool 100. For example, information handling system 122 may process the information from fluid sampling tool 100 for determination of fluid contamination. The information handling system 122 may also determine additional properties of the fluid sample (or reservoir fluid), such as component concentrations, pressure-volume-temperature properties (e.g., bubble point, phase envelop prediction, etc.) based on the fluid characterization. This processing may occur at surface 112 in real-time. Alternatively, the processing may occur downhole hole or at surface 112 or another location after recovery of fluid sampling tool 100 from wellbore 104. Alternatively, the processing may be performed by an information handling system in wellbore 104, such as fluid analysis module 118. The resultant fluid contamination and fluid properties may then be transmitted to surface 112, for example, in real-time.

Figure 2:
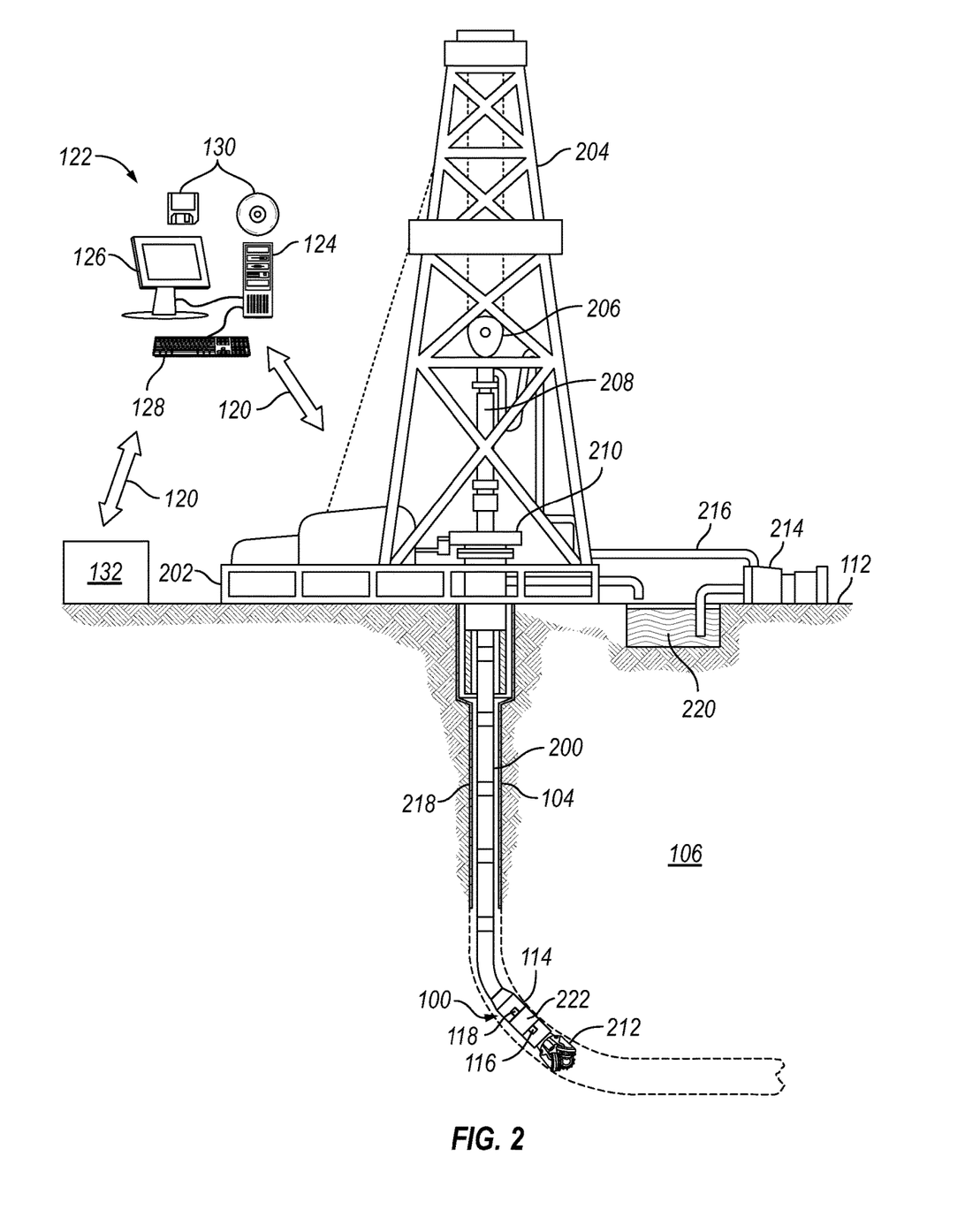
FIG. 2 illustrates a schematic view of another well in which an example embodiment of a fluid sample system is deployed.

Referring now to FIG. 2, a schematic diagram of fluid sampling tool 100 disposed on a drill string 200 in a drilling operation. Fluid sampling tool 100 may be used to obtain a fluid sample, for example, a fluid sample of a reservoir fluid from subterranean formation 106. The reservoir fluid may be contaminated with well fluid (e.g., drilling fluid) from wellbore 104. As described herein, the fluid sample may be analyzed to determine fluid contamination and other fluid properties of the reservoir fluid. As illustrated, a wellbore 104 may extend through subterranean formation 106.

As illustrated in FIG. 2, drilling platform 202 may support a derrick 204 having a traveling block 206 for raising and lowering drill string 200. Drill string 200 may include, but is not limited to, drill pipe and coiled tubing, as generally known to those skilled in the art. A kelly 208 may support drill string 200 as it may be lowered through a rotary table 210. A drill bit 212 may be attached to the distal end of drill string 200 and may be driven either by a downhole motor and/or via rotation of drill string 200 from the surface 112. Without limitation, drill bit 212 may include, roller cone bits, PDC bits, natural diamond bits, any hole openers, reamers, coring bits, and the like. As drill bit 212 rotates, it may create and extend wellbore 104 that penetrates subterranean formations 106. A pump 214 may circulate drilling fluid through a feed pipe 216 to kelly 208, downhole through interior of drill string 200, through orifices in drill bit 212, back to surface 112 via annulus 218 surrounding drill string 200, and into a retention pit 220.

Drill bit 212 may be just one piece of a downhole assembly that may include one or more drill collars 222 and fluid sampling tool 100. Fluid sampling tool 100, which may be built into the drill collars 222 may gather measurements and fluid samples as described herein. One or more of the drill collars 222 may form a tool body 114, which may be elongated as shown on FIG. 2. Fluid sampling tool 100 may be similar in configuration and operation to fluid sampling tool 100 shown on FIG. 1 except that FIG. 2 shows fluid sampling tool 100 disposed on drill string 200. Alternatively, the sampling tool may be lowered into the wellbore after drilling operations on a wireline.

Fluid sampling tool 100 may further include one or more sensors 116 for measuring properties of the fluid sample reservoir fluid, wellbore 104, subterranean formation 106, or the like. The one or more sensors 116 may be disposed within fluid analysis module 118. In examples, more than one fluid analysis module may be disposed on drill string 200. The properties of the fluid are measured as the fluid passes from the formation through the tool and into either the wellbore or a sample container. As fluid is flushed in the near wellbore region by the mechanical pump, the fluid that passes through the tool generally reduces in drilling fluid filtrate content, and generally increases in formation fluid content. The fluid sampling tool 100 may be used to collect a fluid sample from subterranean formation 106 when the filtrate content has been determined to be sufficiently low. Sufficiently low depends on the purpose of sampling. For some laboratory testing, below 10% drilling fluid contamination is sufficiently low, and for other testing, below 1% drilling fluid filtrate contamination is sufficiently low. Sufficiently low also depends on the nature of the formation fluid such that lower requirements are generally needed, for example, for formation fluids having lighter oils as designated by a higher gas-to-oil (GOR) ratio or a higher American Petroleum Institute (API) gravity. Sufficiently low also depends on the rate of cleanup in a cost benefit analysis since longer pumpout times required to incrementally reduce the contamination levels may have prohibitively large costs. As previously described, the fluid sample may comprise a reservoir fluid, which may be contaminated with a drilling fluid, drilling fluid filtrate, another contaminant, or a combination thereof. Fluid sampling tool 100 may obtain and separately store different fluid samples from subterranean formation 106 with fluid analysis module 118. Fluid analysis module 118 may operate and function in the same manner as described above. However, storing of the fluid samples in the fluid sampling tool 100 may be based on the determination of the fluid contamination. For example, if the fluid contamination exceeds a tolerance, then the fluid sample may not be stored. If the fluid contamination is within a tolerance, then the fluid sample may be stored in the fluid sampling tool 100. In examples, contamination may be defined within fluid analysis module 118.

Figure 3:
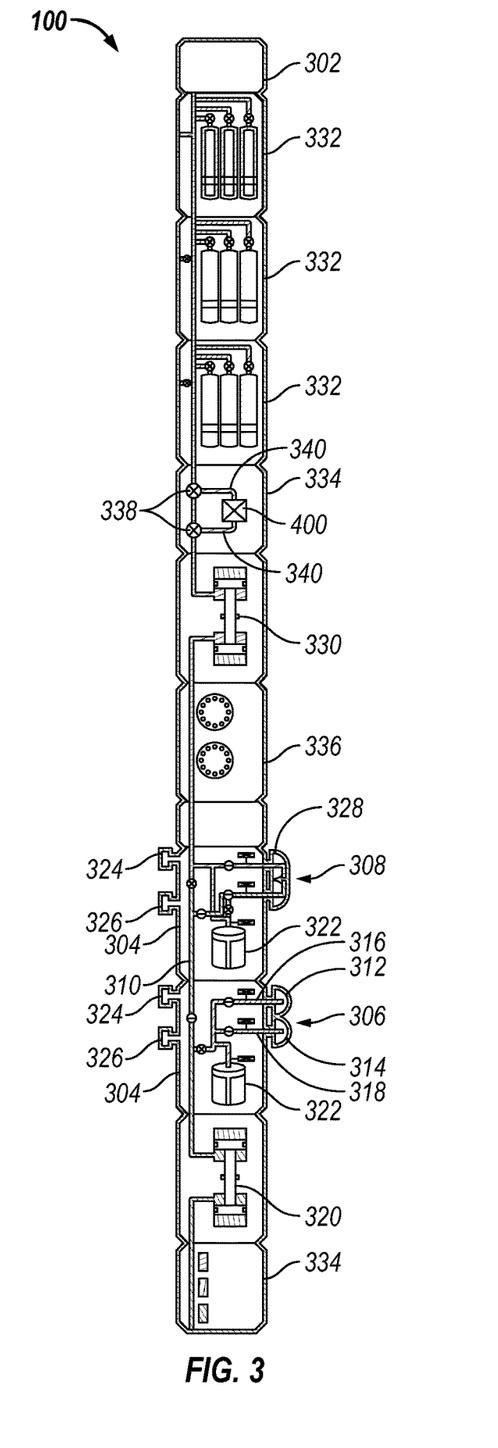
FIG. 3 illustrates a schematic of a fluid sampling tool.

FIG. 3 illustrates a schematic of fluid sampling tool 100. As illustrated, fluid sampling tool 100 includes a power and telemetry section 302 through which fluid sampling tool 100 may communicate with other actuators and sensors in a conveyance (e.g., conveyance 102 on FIG. 1 or drill string 200 on FIG. 2), and/or the conveyance's communications system, such as information handling system 122 (e.g., referring to FIG. 1). In examples, power and telemetry section 302 may also be a port through which the various actuators (e.g., valves) and sensors (e.g., temperature and pressure sensors) in fluid sampling tool 100 may be controlled and monitored. In examples, power and telemetry section 302 may comprise an additional information handling system 122 (not illustrated) that exercises the control and monitoring function. In one example, the control and monitoring function is performed by an information handling system 122 in another part of the drill string or fluid sampling tool 100 (not shown) or by an information handling system at surface 112.

Information from fluid sampling tool 100 may be gathered and/or processed by the information handling system 122 (e.g., referring to FIGS. 1 and 2). The processing may be performed in real-time during data acquisition or after recovery of fluid sampling tool 100. Processing may alternatively occur downhole or may occur both downhole and at surface 112. In some examples, signals recorded by fluid sampling tool 100 may be conducted to information handling system by way of conveyance. Information handling system may process the signals, and the information contained therein may be displayed for an operator to observe and stored for future processing and reference. Information handling system may also contain an apparatus for supplying control signals and power to fluid sampling tool 100.

In examples, fluid sampling tool 100 may include one or more enhanced probe sections 304 and stabilizers 324. Each enhanced probe section may include a dual probe section 306 or a focus sampling probe section 308. Both of which may extract fluid from the reservoir and deliver said fluid to a flow line 310 that extends from one end of fluid sampling tool 100 to the other. Without limitation, dual probe section 306 includes two probes 312, 314 which may extend from fluid sampling tool 100 and press against the inner wall of wellbore 104 (e.g., referring to FIG. 1). Probe flow lines 316 and 318 may connect probe 312, 314 to flow line 310 and allow for continuous fluid flow from subterranean formation 106 to flow line 310. A high-volume bidirectional pump 320 may be used to pump fluids from the formation, through probe flow lines 316, 318 and to flow line 310. Alternatively, a low volume pump bidirectional piston 322 may be used to remove reservoir fluid from the reservoir and house them for asphaltene measurements, discussed below. Two standoffs or stabilizers 324, 326 hold fluid sampling tool 100 in place as probes 312, 314 press against the wall of wellbore 104. In examples, probes 312, 314 and stabilizers 324, 326 may be retracted when fluid sampling tool 100 may be in motion and probes 312, 314 and stabilizers 324, 326 may be extended to sample the formation fluids at any suitable location in wellbore 104. As illustrated, probes 312, 314 may be replaced, or used in conjunction with, focus sampling probe section 308. Focus sampling probe section 308 may operate and function as discussed above for probes 312, 314 but with a single probe 328. Other probe examples may include, but are not limited to, oval probes, packers, or circumferential probes.

In examples, flow line 310 may connect other parts and sections of fluid sampling tool 100 to each other. For example, fluid sampling testing tool 100 may include a second high-volume bidirectional pump 330 for pumping fluid through flow line 310 to one or more multi-chamber sections 332, one or more fluid density modules 334, and/or one or more dynamic subsurface optical measurement tools 336. In examples, a fluid density module 334 may comprise a densitometer 400 for taking fluid density measurements during fluid sampling operations. As illustrated, densitometer 400 may be fluidly connected to flow line 310 by one or more valves 338 and one or more by-pass lines 340. During fluid sampling operations in which fluid density measurements may be taken, one or more valves 338, which may be controlled by information handling system 122 (e.g., referring to FIGS. 1 and 2), may be opened and/or closed to allow fluid to flow through one or more by-pass lines 340 to hydrogel sensor 400. Hydrogel sensor 400 may incorporate a densitometer, a viscometer, a vibrating element containing or surrounded by the hydrogel, or a combination thereof. A densitometer 400 (e.g., referring to FIG. 4) based on a vibrating tube is representative of the type of sensor for hydrogel sensor 400 and in the subsequent text below we will refer to item 400 as a "densitometer".

Figure 4:
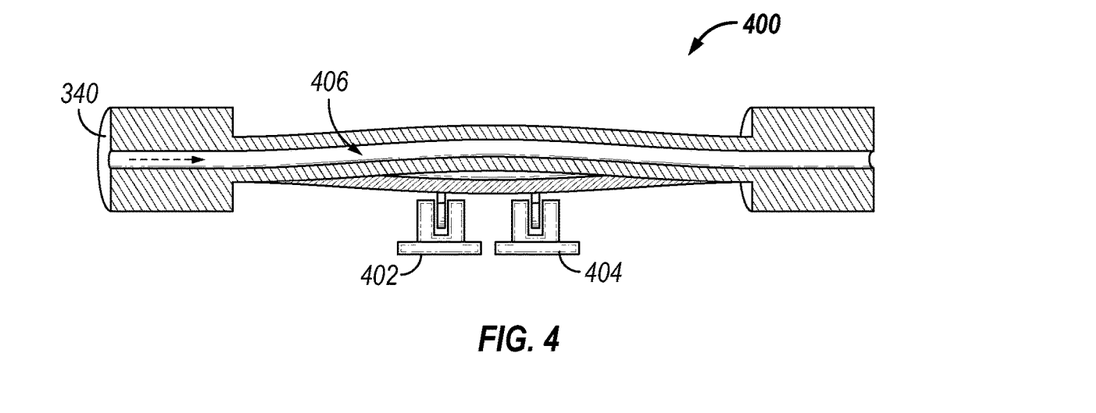
FIG. 4 is a schematic of a densitometer.

As illustrated in FIG. 4, a densitometer 400 comprises a vibration source 402 (comprising a driver coil) that emits vibration through by-pass line 340 (shown moving up and down around driver coil) and a vibration detector 404 (comprising a detector coil) measures the resonant frequency of a portion of by-pass line 340, which is related to the density of the fluid 406. The primary advantage of this densitometer 400 design is its sensitivity to the entire fluid 406 volume contained within the sensor section of the flow tube.

Figure 5:
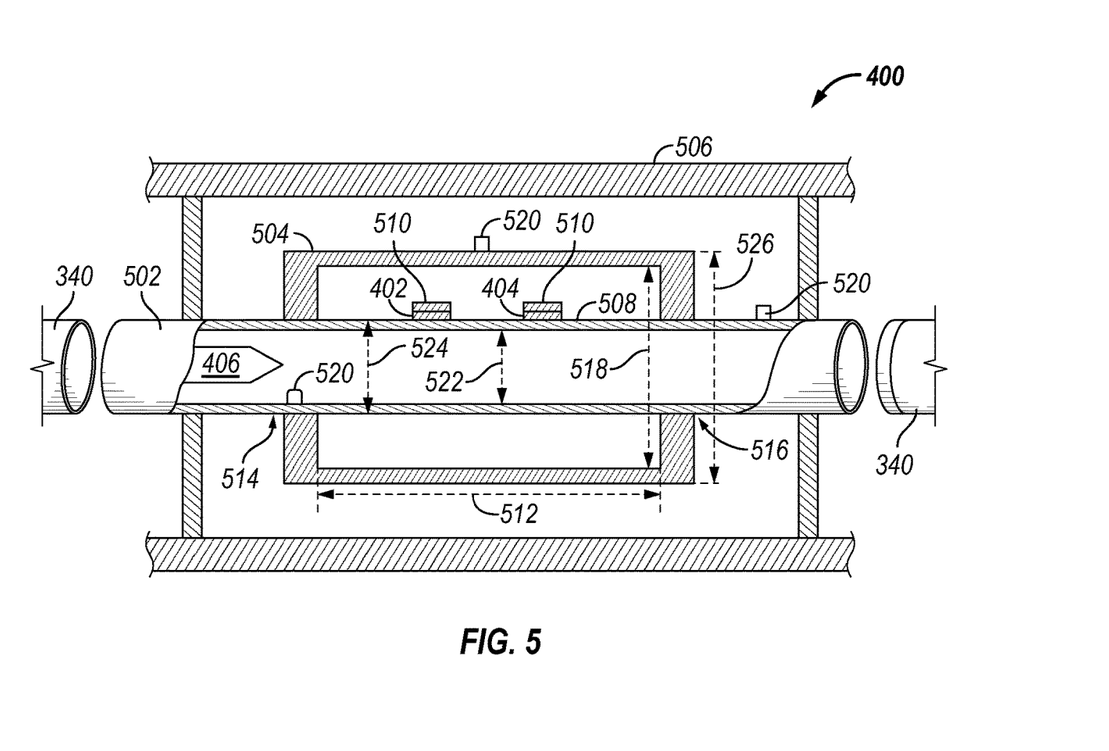
FIG. 5 is a schematic diagram of a densitometer with dissimilar tube and clamp materials.

FIG. 5 is a schematic diagram of densitometer 400 disposed in a fluid density module 334 according to one or more embodiments. As illustrated, densitometer 400 may be disposed with a tube 502 and one or more clamps 504. During sampling operations, a fluid 406 may enter and traverse densitometer 400 through a tube 502. As discussed above, tube 502 may be connected to flow line 310 (e.g., referring to FIG. 3) at both ends by one or more by-pass lines 340. A clamp 504 may be attached to tube 502 and may be disposed within housing 506. Housing 506 may be any structure that may operate and function to shield tube 502 and clamp 504 from external environmental factors such as forces, external fluids, pressure, and/or the like. A vibration source 402 and a vibration detector 404 may be disposed at any location along the outer surface 508 of tube 502. During sampling operations, vibration source 402 and vibration detector 404 may operate and function together to measure and/or identify fluid 406 traversing through tube 502 by utilizing a resonant frequency. In examples, vibration source 402 and vibration detector 404 may be magnets. During operations, both vibration source 402 and vibration detector 404 may move, this movement may be actuated and/or detected by electromagnetic coils (not illustrated) placed in clamp 504.

Vibration source 402 may comprise a magnet affixed to outer surface 508 of tube 502 and one or more electromagnetic coils affixed to the inner section of clamp 504. A material-compensated fluid density estimator 510 may drive an alternating current through the electromagnetic coils which produces an oscillating force on the magnet affixed to tube 502, vibrating tube segment of length L 512 between first clamped end 514 and second clamped end 516. The vibrating tube segment of length 512 may be from 1 mm to 300 mm or from 25 mm to 300 mm. Vibration detector 404 may also comprise a magnet affixed to tube 502 and one or more electromagnetic coils affixed to the inner section of clamp 518. Vibrations in tube 502 may cause the magnet in the vibration detector 404 to vibrate (vertically, in the plane of FIG. 5) which induces an alternating current in the electromagnetic coils in the vibration detector 404. Vibration detector 404 may then send current induced by the varying magnetic field to material-compensated fluid density estimator 510 which may measure the current and infer a measured resonant frequency of fluid 406 inside tube 502. Material-compensated fluid density estimator 510 may be communicatively coupled to vibration source 402 and vibration detector 404 as well as various sensors that may measure either pressure, temperature, strain, or force sensors 520 or a combination throughout densitometer 400.

Although depicted as three sensors 520, more or less than three sensors 520 may be disposed at various locations throughout densitometer 400 to measure temperature for example. Although depicted on the same side of tube 502, vibration source 402 and vibration detector 404 may be affixed to opposite sides of tube 502. The position of vibration source 402 and vibration detector 404 may be designed to maximize the effectiveness of vibrations in tube 502 induced by the vibration source 402 and to minimize interference of magnetic fields created by vibration source 402 on vibration detector 404. Other configurations of magnets and electromagnetic coils may be implemented, and other types of vibration sources and vibration detectors can be used that induce a vibration in tube 502 and accurately measure the resonant frequency of the vibration. For example, vibration source 402 and vibration detector 404 may be part of a resonant electrical circuit designed to maintain the vibrating tube section at resonance. In another embodiment, an optical fiber sensor is bonded to tube 502 and interrogated for dynamic strain. This movement may be utilized to identify fluid 406 traversing through tube 502 as a fluid density measurement. Tube 502 may have an inner diameter 522 of from 1 to 25 mm and an outer diameter 524 of from 2 mm to 25 mm.

A fluid density measurement is recovered as a function of the measured resonant frequency of fluid 406. As noted above, densitometer 400 receives fluid 406 during sampling operations. During fluid density measurement operations, densitometer 400 may vibrate at a resonant frequency. Generally, the resonant frequency of tube segment 512 between a first clamped end 514 and a second clamped end 516 may be measured. Within tube segment 512 the measured resonant frequency of fluid 406 is a function of both the actual fluid density in tube 502, as well as several other physical characteristics of densitometer 400 and its environment, such as the temperatures of clamp 504 and tube 502, the coefficients of thermal expansion (CTE) of clamp 504 and tube 502, the axial pre-tension force retained in tube 502 between first clamped end 514 and second clamped end 516, any external force exerted on tube 502 outside of clamp 504, the Young's moduli of tube 502 and clamp 504, inner diameter 522 and outer diameter 524 of tube 502, inner clamp diameter 518 and outer clamp diameter 526, the density of material that forms tube 502, the length of clamp, the pressure of fluid 406, and/or additional factors. Additionally, resonant frequency vibration may be controlled utilizing a hydrogel described above. Controlling resonant frequency vibration may allow personnel to calibrate densitometer 400 for any location within wellbore 104 (e.g., referring to FIG. 1).

Figure 6:
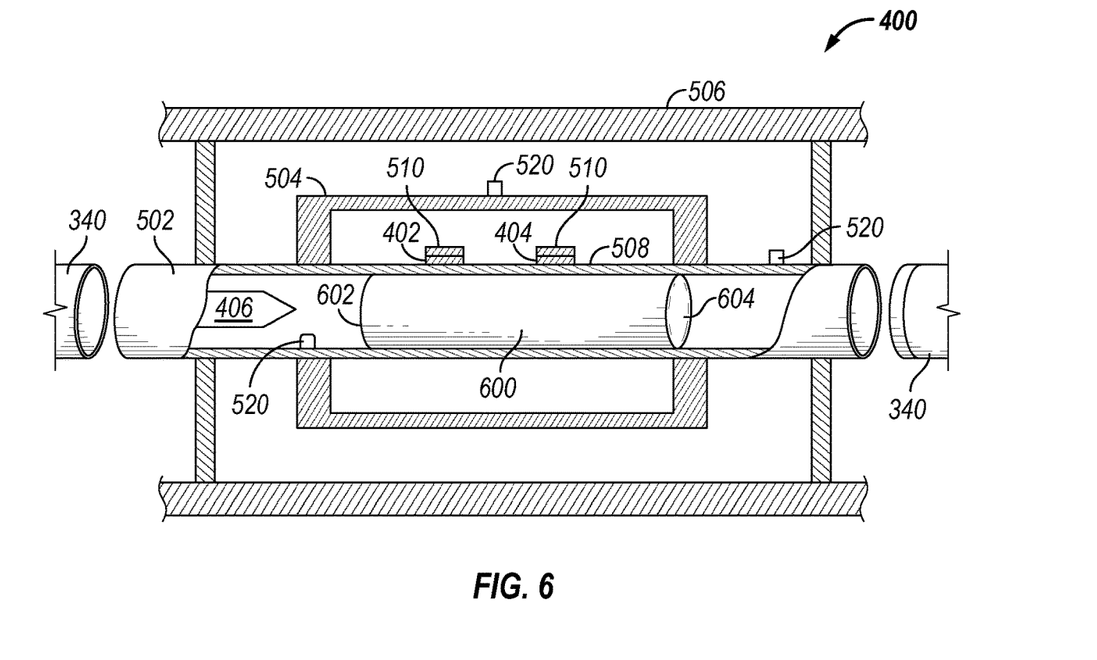
FIG. 6 is a schematic diagram of a hydrogel disposed within a densitometer with dissimilar tubes and clamp materials.

FIG. 6 illustrates hydrogel 600 disposed within densitometer 400 according to one or more embodiments. As illustrated, hydrogel 600 may be disposed in or about vibrating tube segment length 512 (e.g., referring to FIG. 5) and held in place by one or more screens with front screen 602 and back screen 604 for example. Screens 602 and 604 may operate and function as a structural support to hold hydrogel 600 in place while allowing fluid 406 to pass through and traverse through hydrogel 600. Screens 602 and 604 may be polymeric, ceramic, metallic or a combination thereof. Several densitometers 400 with different hydrogels 600 sensitive to different analyte may be disposed one after the other for a more complete measurement of water chemistry. A densitometer 400 sensitive to $Na^+$ may be connected to another densitometer 400 sensitive to $Ca^{2+}$, connected to another densitometer 400 sensitive to $F^-$, connected to another one sensitive to $Mg^{2+}$, connected to another one sensitive to K+, connected to another one sensitive to Li+, and/or connected to another densitometer 400 sensitive to pH variation may be disposed within one or more fluid density modules 334, for example.

During operations, fluid 406 may be diverted from flow line 310 by one or more valves 338 and one or more by-pass lines 340 (e.g., referring to FIG. 3). As fluid 406 traverses through by-pass lines 340, it may be filtered by one or more filtering devices (not illustrated). The filtering device may be made out of one or more ceramics, polymers, metals, or a combination thereof. These filtering devices may remove oil, particulates, and/or the like from fluid 406. In examples, the removed oil, particulates, and/or the like may be returned to flow line 310 by one or more by-pass lines 340. In other examples, hydrogel 600 may be inserted into tube 406 and/or by-pass lines 340 from an internal compartment (not illustrated) that may house a reservoir of hydrogel 600. During operations, hydrogel 600 may be moved into densitometer 400 by a pump, not illustrated, utilizing one or more by-pass lines 340.

Generally, hydrogel 600 may be defined as a stimuli-responsive polymer. Stimuli-responsive polymers are plastic materials with molecule chains crosslinked to a three-dimensional network. They are synthesized by a crosslinking reaction between polymer molecules or by a crosslinking polymerization, which is simultaneously synthesizing polymer chains and linking them concomitantly. Polymer molecules consist of small molecular units, the so-called monomers, which may be arranged in a sequence to form a long polymer chain or to form branched polymer molecules with side chains. Generally, all polymers are solvophilic to certain solvents. Polymers that are not crosslinked are soluble in presence of these solvents. Due to the interconnections between the chains, crosslinked polymers are insoluble but swell by solvent absorption. If the crosslinked polymers swell in water, they are called hydrogels. Hydrogels 600 may change their volume significantly in response to small alterations of certain environmental parameters.

For example, a network of pH sensitive hydrogel 600 may comprise a backbone polymer carrying weak acidic or basic groups. The backbone polymer provides a mechanical stability of the gel whereas the ionizable group contributes to the pH sensitivity. In some embodiments, a pH sensor comprises a pH sensitive hydrogel 600 and a vibrating detector 404 that may detect the changes of hydrogel 600 volume through the changes of material characteristics affecting the vibration properties of the vibrating element. For instance, a hydrogel 600 sensitive to changes of pH may be a polyelectrolyte hydrogel comprising weak acidic and weak basic groups, respectively, which may be ionized. For example, gels containing acidic groups are deprotonated in a basic environment as follows:

reaction 1

[RCOOH]gel + [OH−]$_{aq}$ ⇌ [RCOO−]$_{gel}$ + H$_2$O

Therefore, the density of likewise charged groups within the network strongly increases accompanied by an adequate generation of mobile counterions inside the gel, which induces the phase transition due to electrostatic repulsion.

In an acidic environment, the acidic gel protonates as follows:

reaction 2

[RCOO−]gel + [H+]$_{aq}$ ⇌ [RCOOH]$_{gel}$ resulting in a decrease of both the charge density and the content of mobile counterions within the hydrogel leading to gel shrinking. The shrinking hydrogel 600 may change its vibrating characteristics that the operator will be able to interpret as a change of pH downhole in real-time.

The working range of the pH sensor may be defined by the selection of the ionizable hydrogel component. In many cases, the working range is directly corresponding to the $pK_a$ of the ionic group. The phase transition of the gels occurs in the small range close by the apparent acid dissociation constant $pK_a$ of the hydrogel which is mostly identical with the $pK_a$ of the ionizable group. Approximately at the apparent $pK_a$ of the gel, the ionization begins accompanied by a drastic swelling of hydrogel 600. If the ionization of the ionizable component is completed, the swelling process stops. Further pH increase only increases the ionic strength. This decreases the osmotic pressure and leads to shrinking of hydrogel 600.

The composition of hydrogel 600 determines the $pK_a$ value and the nature (acidic or basic) of the pH sensitive group or the ionizable component. In some embodiments, the backbone of hydrogel 600 is made up of poly(ethylene glycol) dimethacrylate (PEGDMA) and the pH sensitive groups consists of methacrylic acid (MAA) as ionizable component. In other embodiments, hydrogel 600 comprises a poly(vinyl alcohol)-poly(acrylic acid) network. As the $pK_a$ of the poly(acrylic acid) is around 4.7 and the ionization of the acidic groups is complete at pH 9, the poly(vinyl alcohol)-poly(acrylic acid) hydrogel is most sensitive within this range corresponding to the phase transition range. Below that range, hydrogel 600 is shrunk accompanied by marginal sensitivity. Hydrogels 600 may have a high sensitivity per pH unit within the phase transition range, in the order of $10^{-3}$ to $10^{-5}$.

The sensing capabilities of hydrogel 600 are primarily driven by hydrogel's polymer headgroups and their interactions with the analyte. Headgroups of hydrogels 600 include carboxylic acids, ammonium, sulfonates, amides, amines, and hydroxyls, which may all be leveraged to effectively absorb and concentrate ions from solution to reach detection limits in the sub-ppm range. Therefore, it is possible to tune the sensing capabilities of hydrogel 600 to a particular analyte. Common device responses are generated by analyte-headgroup interactions that act to swell or shrink hydrogel 600, but may also change color, and/or alter its resistance, capacitance, impedance, or voltammetry. A variety of detection methods such as vibrational, resistive, or photonic may be used in unison as confirmatory methods or alone depending upon the availability of the detection method.

In some embodiments, a sensor comprising hydrogel 600, vibration source 402 and vibration detector 404, is used to monitor corrosion of iron-containing material downhole. As fluid is pumped inside the fluid sampling tool 100, the concentration of $Fe^{2+}$ is measured using the changes in physical characteristics of hydrogel 600 comprising poly(vinyl alcohol) derivatives. For instance, some hydrogels comprise co-polymers of acrylamido-methylpropane sulfonic acid (AMPS) and polyacrylic acid (PAA) crosslinked by methylene bis-acrylamide. The affinity of the AMPS sulfonic acid headgroups to form associations with ions can induce significant volumetric and mechanical changes.

The exact nature of the association depends upon the types of ions present. For instance, some rare-earth metal ions such as $Na^+$ bond strongly to the headgroup and may show irreversible behavior. However, transition metal ions such as $Fe^{2+}$ tend towards quasi-covalent bonds with the headgroup but form a more reversible complex. In contrast, alkali earth ions such as $Ca^{2+}$ do not form covalent bond but rely on electrostatic interactions instead and the formation of the complex is reversible. Therefore, the types of ions present within hydrogel 600 may affect the hydrogen bonding and viscosity of the hydrogel. Thus, the operator may be able to monitor each one of these ions by following the vibrating characteristics of the vibrating elements, vibration source 402 and vibration detector 404, within densitometer 400 of fluid sampling tool 100. For instance, hydrogels 600 comprising co-polymers of acrylamido-methylpropane sulfonic acid (AMPS) and polyacrylic acid (PAA) exposed to ions of $Cu^{2+}$, $Fe^{2+}$, $Mn^{2+}$, $Ni^{2+}$, $Pb^{2+}$, $Co^{2+}$, $Sn^{2+}$, $Cd^{2+}$, $Zn^{2+}$, $Mo^{5+}$, and $Ag^+$ show a change in volume with increasing ion concentration, which will be recorded by the operator as the vibrating characteristics change inside hydrogel 600 disposed within densitometer 400 of fluid sampling tool 100. In some embodiments, $Fe^{2+}$ is detected which indicates active corrosion. In other embodiments, corrosion inhibitors are detected by hydrogel 600 to monitor the efficacy of a corrosion inhibitor treatment.

Accordingly, the present disclosure may provide methods and systems for calibrating a densitometer, a viscometer, or a vibrating element sensor downhole utilizing a hydrogel. The methods may include any of the various features disclosed herein, including one or more of the following statements.

Statement 1. A fluid sampling tool of Statement 1 comprising a fluid characterization device consisting of a densitometer, a viscometer, or a vibrating element, or a combination thereof; and a polymer disposed in or around the fluid characterization device, wherein the polymer volume, density, or viscosity changes with an ionic stimulus.

Statement 2. The fluid sampling tool of Statement 1, wherein a resonant frequency produced by the vibrating element changes between the polymer and the swollen polymer.

Statement 3. The fluid sampling tool of Statement 1 or Statement 2, wherein a frequency changes based at least in part on the ratio of the ionic stimuli to polymer.

Statement 4. The fluid sampling tool of any preceding Statements, wherein the polymer is an oleophobic hydrogel that comprises a polyelectrolytic polymer.

Statement 5. The fluid sampling tool of any preceding Statements, wherein the polymer is a hydrophilic hydrogel that comprises a polyelectrolytic polymer.

Statement 6. The fluid sampling tool of any preceding Statements, further comprising at least one micro filter disposed within the fluid characterization device.

Statement 7. The fluid sampling tool of any preceding Statements, wherein the vibrating element is a densitometer tube.

Statement 8. The fluid sampling tool of any preceding Statements, wherein the vibrating element is a wire.

Statement 9. The fluid sampling tool of any preceding Statements, wherein the vibrating element is a tuning fork.

Statement 10. The fluid sampling tool of any preceding Statements, wherein the ionic stimuli is $Na^+$, $Li^+$, $H^+$, $Ca^{2+}$, $Cl^-$, $F^-$, $Mg^{2+}$, $S^{2-}$, $CO_3^{3-}$, $SO_4^{2-}$, or $K^+$.

Statement 11. The fluid sampling tool of any preceding Statements, further comprising the fluid characterization device and the polymer located within a flow line of the sampling tool or a bypass flow line isolated from the flow line.

Statement 12. The fluid sampling tool of any preceding Statements, wherein the polymer is kept around the fluid characterization device by at least one micro filter.

Statement 13. The fluid sampling tool of any preceding Statements, wherein the polymer comprises a hydrogel with a poly(ethylene glycol) dimethacrylate (PEGDMA) backbone and methacrylic acid (MAA) as ionizable component.

Statement 14. The fluid sampling tool of any preceding Statements, wherein the polymer comprises a hydrogel with a poly(vinyl alcohol)-poly(acrylic acid) network.

Statement 15. A method of measuring pH of a formation fluid comprising: lowering a fluid sampling tool downhole, the fluid sampling tool comprising: a fluid characterization device consisting of a densitometer, a viscometer, or a vibrating element, or a combination thereof; and a polymer disposed in or around the fluid characterization device, wherein the polymer resonant frequency changes with pH; pumping the formation fluid to expose it to the fluid characterization device and the polymer disposed in or around the fluid characterization device; measuring the polymer resonant frequency disposed in or around the fluid characterization device; and calculating the pH.

Statement 16. The method of measuring pH of Statement 15, further comprising the fluid characterization device and the polymer located within a flow line of the sampling tool or a bypass flow line isolated from the flow line.

Statement 17. The method of measuring pH of Statement 15 or Statement 16, wherein the polymer is kept around the fluid characterization device by at least one micro filter.

Statement 18. The method of measuring pH of any of Statements 15-17, wherein the polymer comprises a hydrogel with a poly(ethylene glycol) dimethacrylate (PEGDMA) backbone and methacrylic acid (MAA) as ionizable component.

Statement 19. A method of monitoring at least two analytes downhole comprising: lowering a downhole tool, the downhole tool comprising: at least two fluid characterization device consisting of a densitometer, a viscometer, or a vibrating element, or a combination thereof; and a polymer disposed in or around each of the at least two fluid characterization devices, wherein the polymer resonant frequency changes as a function of at least one analyte concentration; pumping a formation fluid to expose it to the fluid characterization device and the polymer disposed in or around each of the at least two fluid characterization devices; measuring the change of the polymer resonant frequency disposed in or around each of the at least two fluid characterization devices; and calculating the concentration of the at least two analytes.

Statement 20. The method of monitoring at least two analytes of claim 19, wherein the analytes are $Na^+$, $Li^+$, $H^+$, $Ca^{2+}$, $K^+$, $F^-$, $S^{2-}$, $CO_2^{3-}$, $SO_4^{2-}$, or $Mg^{2+}$.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "including," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A fluid sampling tool comprising:
   a fluid characterization device consisting of a densitometer, a viscometer, or a vibrating element, or a combination thereof; and
   a polymer disposed in or around the fluid characterization device, wherein a polymer volume, density, or viscosity changes with an ionic stimulus, and wherein the polymer is an oleophobic hydrogel that comprises a polyelectrolytic polymer.

2. The fluid sampling tool of claim 1, wherein a resonant frequency produced by the vibrating element changes between the polymer and the swollen polymer.

3. The fluid sampling tool of claim 1, wherein a frequency changes based at least in part on a ratio of the ionic stimuli to polymer.

4. The fluid sampling tool of claim 1, wherein the polymer is a hydrophilic hydrogel that comprises a polyelectrolytic polymer.

5. The fluid sampling tool of claim 1, further comprising at least one micro filter disposed within the fluid characterization device.

6. The fluid sampling tool of claim 1, wherein the vibrating element is a densitometer tube.

7. The fluid sampling tool of claim 1, wherein the vibrating element is a wire.

8. The fluid sampling tool of claim 1, wherein the vibrating element is a tuning fork.

9. The fluid sampling tool of claim 1, wherein the ionic stimulus is $Na^+$, $Li^+$, $H^+$, $Ca^{2+}$, $Cl^-$, $F^-$, $Mg^{2+}$, $S^{2-}$, $CO_3^{2-}$, $SO_4^{2-}$, or $K^+$.

10. The fluid sampling tool of claim 1, further comprising the fluid characterization device and the polymer located within a flow line of the sampling tool or a bypass flow line isolated from the flow line.

11. The fluid sampling tool of claim 1, wherein the polymer is kept around the fluid characterization device by at least one micro filter.

12. The fluid sampling tool of claim 1, wherein the polymer comprises a hydrogel with a poly(ethylene glycol) dimethacrylate (PEGDMA) backbone and methacrylic acid (MAA) as ionizable component.

13. The fluid sampling tool of claim 1, wherein the polymer comprises a hydrogel with a poly(vinyl alcohol)-poly(acrylic acid) network.

14. A method of measuring pH of a formation fluid comprising:
   lowering a fluid sampling tool downhole, the fluid sampling tool comprising:
      a fluid characterization device consisting of a densitometer, a viscometer, or a vibrating element, or a combination thereof; and
      a polymer disposed in or around the fluid characterization device, wherein a polymer resonant frequency changes with pH, and wherein the polymer is an oleophobic hydrogel that comprises a polyelectrolytic polymer;
   pumping the formation fluid to expose it to the fluid characterization device and the polymer disposed in or around the fluid characterization device;
   measuring a change in the polymer resonant frequency disposed in or around the fluid characterization device; and
   calculating the pH.

15. The method of measuring pH of claim 14, further comprising the fluid characterization device and the polymer located within a flow line of the sampling tool or a bypass flow line isolated from the flow line.

16. The method of measuring pH of claim 14, wherein the polymer is kept around the fluid characterization device by at least one micro filter.

17. The method of measuring pH of claim 14, wherein the polymer comprises a hydrogel with a poly(ethylene glycol) dimethacrylate (PEGDMA) backbone and methacrylic acid (MAA) as ionizable component.

18. A method of monitoring at least two analytes downhole comprising:
   lowering a downhole tool, the downhole tool comprising:
      at least two fluid characterization devices consisting of a densitometer, a viscometer, or a vibrating element, or a combination thereof; and
      a polymer disposed in or around each of the at least two fluid characterization devices, wherein the polymer resonant frequency changes as a function of at least one analyte concentration, and wherein the polymer is an oleophobic hydrogel that comprises a polyelectrolytic polymer;

pumping a formation fluid to expose it to the at least two fluid characterization devices and the polymer disposed in or around each of the at least two fluid characterization devices;

measuring a change in the polymer resonant frequency disposed in or around each of the at least two fluid characterization devices; and calculating the concentration of the at least two analytes.

19. The method of monitoring at least two analytes of claim 18, wherein one of the analytes is $Na^+$, $Li^+$, $H^+$, $Ca^{2+}$, $K^+$, $F^-$, $S^{2-}$, $CO_2^{3-}$, $SO_4^{2-}$, or $Mg^{2+}$.

* * * * *